United States Patent
Tandekar et al.

(12) 
(10) Patent No.: US 12,185,131 B2
(45) Date of Patent: Dec. 31, 2024

(54) SYSTEMS AND METHODS FOR TELECOMMUNICATION NETWORK SOFTWARE PARAMETER OPTIMIZATION

(71) Applicant: DISH Wireless L.L.C., Englewood, CO (US)

(72) Inventors: Dilip Tandekar, Broadlands, VA (US); Premchand Chandran, Brambleton, VA (US); Sang Boh Yun, Ashburn, VA (US)

(73) Assignee: DISH WIRELESS L.L.C., Englewood, CO (US)

(*) Notice: Subject to any disclaimer, the term of this patent is extended or adjusted under 35 U.S.C. 154(b) by 337 days.

(21) Appl. No.: 17/737,871

(22) Filed: May 5, 2022

(65) Prior Publication Data
US 2023/0362674 A1    Nov. 9, 2023

(51) Int. Cl.
*H04L 41/0816* (2022.01)
*H04L 41/082* (2022.01)
*H04L 41/0823* (2022.01)
*H04L 41/14* (2022.01)
*H04W 16/18* (2009.01)
*H04W 24/02* (2009.01)
*H04W 24/08* (2009.01)
*H04W 28/06* (2009.01)
*H04W 84/02* (2009.01)
(Continued)

(52) U.S. Cl.
CPC ......... *H04W 24/02* (2013.01); *H04L 41/0816* (2013.01); *H04L 41/082* (2013.01); *H04L 41/0823* (2013.01); *H04L 41/145* (2013.01); *H04W 16/18* (2013.01); *H04W 24/08* (2013.01); *H04W 28/06* (2013.01); *H04W 84/02* (2013.01); *H04W 88/08* (2013.01); *H04W 88/12* (2013.01); *H04W 88/18* (2013.01); *H04W 92/02* (2013.01); *H04W 92/12* (2013.01)

(58) Field of Classification Search
CPC ....... H04B 17/0082–3913; H04L 41/02–5096; H04L 43/02–55; H04L 47/10–83; H04W 4/02–027; H04W 8/005–30; H04W 16/02–32; H04W 24/02–10; H04W 28/02–26; H04W 64/003–006; H04W 84/005–22; H04W 88/005–188; H04W 92/02–24
See application file for complete search history.

(56) References Cited

U.S. PATENT DOCUMENTS

| | | | |
|---|---|---|---|
| 7,441,021 B1* | 10/2008 | Perry | H04L 41/0816 |
| 2018/0295019 A1* | 10/2018 | Magnusson | H04L 41/0886 |
| 2022/0225125 A1* | 7/2022 | Atkins | H04W 24/02 |

* cited by examiner

*Primary Examiner* — Timothy J Weidner
(74) *Attorney, Agent, or Firm* — Seed IP Law Group LLP (57) ABSTRACT

A market parameter optimization system identifies optimized parameters for software associated with a telecommunication network market and causes the software to be configured based on the optimized parameters. The market parameter optimization system receives an indication of a telecommunication network market and one or more attributes of the telecommunication network market. The market parameter optimization system identifies one or more optimized parameters for software associated with the telecommunication network market based on the attributes of the telecommunication network market. The market parameter optimization system causes at least a portion of the software associated with the telecommunication network market to be configured based on the one or more attributes.

15 Claims, 8 Drawing Sheets

(51) Int. Cl.
*H04W 88/08* (2009.01)
*H04W 88/12* (2009.01)
*H04W 88/18* (2009.01)
*H04W 92/02* (2009.01)
*H04W 92/12* (2009.01)

SYSTEMS AND METHODS FOR TELECOMMUNICATION NETWORK SOFTWARE PARAMETER OPTIMIZATION

BRIEF SUMMARY

Telecommunication networks, such as 4G/5G networks, typically include multiple telecommunication network markets, which include telecommunication software used to provide network services to subscribers within a geographic area. While standard operating parameters, including ranges for the operating parameters, are set by standard setting organizations, such as 3GPP standards, these parameters are not optimized for particular telecommunication network markets. Additionally, although network engineers configure the parameters used by software in a telecommunication network market, it is difficult to re-test and change parameters when the attributes of the telecommunication network market, such network traffic, size, or other network attributes, change.

The embodiments disclosed herein address the issues above and thus help solve the above technical problems and improve the technology of telecommunication network markets by providing a technical solution that identifies attributes of a telecommunication network market and identifies optimized parameters for software within the telecommunication network market, used to implement the telecommunication network market, etc. Additionally, embodiments disclosed herein are able to cause the software within the telecommunication network market to be configured based on the optimized parameters. Furthermore, the embodiments disclosed herein are able to dynamically identify new optimized parameters for the software included in the telecommunication network market and cause at least a portion of the software to be configured based on the new optimized parameters.

In some embodiments, a market parameter optimization system receives an indication of a telecommunication network market including one or more attributes of the telecommunication network market, receives an indication of telecommunication software which will be deployed at the telecommunication network market, identifies one or more optimized parameters for the indicated telecommunication software based on at least the one or more attributes of the telecommunication network market, and causes at least a portion of the telecommunication network software to be configured based on the one or more optimized parameters.

In some embodiments, a market parameter optimization system uses a telecommunication network market optimization data structure to cause at least a portion of telecommunication software associated with a telecommunication network market to be configured based on one or more optimized parameters. The telecommunication network market optimization data structure may include information specifying a target telecommunication network market, information specifying software associated with the target telecommunication network market, and information specifying a plurality of optimized parameters for telecommunication software.

In some embodiments, a method for operating telecommunication network parameter optimization system includes electronically receiving an indication of a telecommunication network market, electronically receiving an indication of telecommunication software which will be deployed at the telecommunication network market, electronically identifying one or more optimized parameters for the telecommunication software based on at least one or more attributes of the telecommunication network market, and electronically causing at least a portion of the indicated telecommunication software to be configured based on the one or more optimized parameters.

DETAILED DESCRIPTION

Network providers, such as telecommunication network providers, cellular network providers, etc., typically divide their networks into telecommunication network markets ("markets", "network markets"). Each market represents a geographic region within which telecommunication network software ("software", "telecommunication software") is implemented to provide telecommunication services to the market. The telecommunication network software includes software used by the network to implement the telecommunication network, such as, for example, a software-based network operated on the cloud. Furthermore, the telecommunication network software may be provided by one or more vendors, such as an independent software vendor. Telecommunication network software is typically optimized manually by network engineers associated with a network provider in order to provide a target quality of service for network subscribers ("users" or "subscribers") within the market.

However, while standard operating parameters are set by standards setting organizations, these parameters are not optimized for particular markets and may encompass a wide range of values. Furthermore, telecommunication network software vendors ("vendors" or "independent software vendors") may provide their own sets of parameters for the telecommunication network software that they provide. At least some of the vendor parameters may be "optimized" for one market, but not for other markets, and may not be optimized to achieve the same target quality of service that a network provider wishes to provide. Thus, network engineers must manually test and re-test telecommunication network software with different sets of parameters in order to attain a target quality of service for subscribers.

Additionally, when a change in the attributes of a market occur network engineers must re-test and change telecommunication network software parameters further in order to maintain the same level of quality of service for subscribers. Furthermore, the change in a market's attributes may be so short-lived that engineers are unable to change the telecommunication network software parameters before the attributes return to normal, such as when the market experiences abnormally high traffic for a short period of time.

The embodiments disclosed herein help solve the above technical problems and improve the technology of telecommunication network markets by providing a technical solution that identifies attributes of a telecommunication network market and identifies optimized parameters for telecommunication network software within the telecommunication network market. Additionally, embodiments disclosed herein are able to cause the telecommunication network software within the telecommunication network market to be configured based on the optimized parameters. Furthermore, the embodiments disclosed herein are able to dynamically identify new optimized parameters for the telecommunication network software within the telecommunication network market and cause at least a portion of the telecommunication network software to be configured based on the new optimized parameters.

In some embodiments, the market parameter optimization system receives an indication of a telecommunication network market. The indication of the telecommunication network market may include one or more attributes of the telecommunication network market. The one or more attributes of the telecommunication network market may include one or more of: a morphology of the telecommunication network market; a traffic pattern of a telecommunication network market; telecommunication network software used by the telecommunication network market; and other attributes of the telecommunication network market.

In some embodiments, data indicating a morphology of a telecommunication network market may include one or more of: data indicating a type of the region within which the market is located, such as rural, urban, suburban, coastal, or another type of region; data indicating a geographic area within which the market is located, such as within a certain radius, a list of coordinates defining the geographic area, or other methods of denoting a geographic region for providing network services; and other data used to indicate the form or structure of a telecommunication network. The data indicating a morphology of a network may be used to predict coverage provided by the network, such as predicting a coverage area, portions of the coverage area at which the network is unable to provide adequate quality of service, or other aspects of the coverage of a network.

In some embodiments, data indicating or describing a traffic pattern of a telecommunication network market includes data indicating one or more of: the number of user devices able to access the network within the network market; signal interference occurring within the coverage area of the network market; the available bandwidth of the network market; signal strength for individual users accessing the network within the network market; upload speeds experienced by user devices in the network market; download speeds experienced by user devices in the network market; or other data useful for describing a traffic pattern in a network market. The data indicating or describing the traffic pattern of the network market may be obtained from one or more of: telecommunication network software included in the network market; user devices connected to the network market; one or more entities other than users or the network provider ("third parties") which obtain traffic pattern data for geographic regions; crowd-sourced data from users, the network provider, or third parties; or other methods of obtaining data indicating or describing a traffic pattern for a network market.

In some embodiments, the market parameter optimization system receives an indication of telecommunication network software which may be used for the telecommunication network market. The indication of the telecommunication network software may include data describing the telecommunication network software, such as: a vendor which provides the telecommunication network software, the type of telecommunication network software, or other data used to describe telecommunication network software.

In some embodiments, the market parameter optimization system identifies one or more optimized parameters for the indicated telecommunication network software based on at least the one or more attributes of the telecommunication network market. In some embodiments, the one or more optimized parameters may be obtained based on at least the one or more attributes of the telecommunication network market and the indication of the telecommunication network software. The one or more optimized parameters may be obtained by comparing at least the attributes of the telecommunication network market to attributes of other telecommunication network markets. The market parameter optimization system may compare the attributes of the telecommunication network market to other telecommunication network markets by using one or more of: statistical analysis; machine learning models; artificial intelligence; and other techniques for comparing data regarding telecommunication network markets. For example, the market parameter optimization system may train a machine learning model to identify optimized parameters for the telecommunication network software based on one or more of: telecommunication network market attributes, one or more optimized parameters for telecommunication network software, and telecommunication network software data.

In some embodiments, the market parameter optimization system causes at least a portion of the indicated telecommunication network software to be configured based on the one or more optimized parameters. The market parameter optimization system may cause telecommunication network software to be configured by transmitting or otherwise communicating the one or more optimized parameters and instructions to apply the parameters to one or more of the telecommunication network software, a computing system or device in the telecommunication network market which is able to configure the telecommunication network software, and other equipment or computing devices able to apply parameters to telecommunication network software.

In some embodiments, the market parameter optimization system accesses a repository of telecommunication network market data to identify one or more optimized parameters for a telecommunication network market. The repository of telecommunication network market data may be stored within the market parameter optimization system. The repository of telecommunication network market data may be stored within one or more computing devices or systems other than the market parameter optimization system. The repository of telecommunication network market data may include data describing one or more attributes of one or more telecommunication network markets. The repository of telecommunication network market data may include data describing telecommunication network software used by telecommunication network markets. The repository of telecommunication network market data may include one or more parameters for telecommunication network software. The repository of telecommunication network market data may include one or more optimized parameters for telecommunication network software. The market parameter optimization system may use the repository of telecommunication network market data to compare the attributes of the telecommunication network market to other telecommunication network markets.

In some embodiments the repository of telecommunication network market data includes one or more optimized parameters for telecommunication network markets. The repository of telecommunication network market data may include multiple sets of optimized parameters for markets with the same attributes. Thus, the telecommunication network software in the market may be optimized for different aspects of quality of service even when the attributes of the market have not changed. For example, a first market may be optimized to provide faster upload and download speeds, where a second market with similar attributes to the first market may be optimized to allow a greater number of user devices to connect to the network.

In some embodiments, the market parameter optimization system receives an indication that at least one attribute of the telecommunication network market has changed. The market parameter optimization system may receive the indication that at least one attribute of the market has changed in "real-time," such as within a short period of time after the attribute of the market has changed. The market parameter optimization system may identify one or more new optimized parameters for at least a portion of the telecommunication network software included in the telecommunication network market. The market parameter optimization system may identify the one or more new optimized attributes based on at least: the attributes of the telecommunication network market and the indication that at least one attribute of the telecommunication market has changed. The market parameter optimization system may cause the at least a portion of the telecommunication network software to be configured based on the one or more new optimized parameters.

In some embodiments, the market parameter optimization system receives an indication that one or more parameters of telecommunication network software in the telecommunication network market have changed. The market parameter optimization system may determine whether the change in parameters caused an improvement in the quality of service provided to users. The market parameter optimization system may update optimized parameters stored in a repository of telecommunication network market data for network markets with similar attributes to the telecommunication network market based on the determination of whether the change in parameters caused an improvement in the quality of service. In some embodiments, the market parameter optimization system causes telecommunication network software in other telecommunication network markets with attributes similar to the telecommunication network market to change their parameters based on the updated optimized parameters.

In some embodiments, the market parameter optimization system receives one or more parameters for telecommunication network software from a vendor. The vendor may be an entity which provides, configures, develops, produces, etc., the telecommunication network software. The market parameter optimization system may access one or more standards which define standard values or ranges for telecommunication network software parameters, such as 3GPP standards in the case of 5G networks. The market parameter optimization system may map the telecommunication network software parameters to the standard parameters. The market parameter optimization system may map the telecommunication network software parameters by determining which standard parameters correspond to the telecommunication network software parameters provided by the vendor. In some embodiments, the market parameter optimization system receives an indication of one or more parameters for network functions provided by a vendor. The market parameter optimization system may map the parameters for network functions to standard parameters for network functions, such as those defined in the 3GPP standard for 5G networks. The market parameter optimization system may use the parameter mapping to apply optimized parameters to telecommunication network software.

In some embodiments, the market parameter optimization system includes a telecommunication network optimization data structure which is used to cause at least a portion of telecommunication network software in a network market to be configured based on one or more optimized parameters. The telecommunication network market optimization data structure may include information specifying a target telecommunication network market, including one or more attributes of the target telecommunication network market. The telecommunication network optimization data structure may include information specifying telecommunication network software associated with the target telecommunication network market. The telecommunication network optimization data structure may include information specifying a plurality of optimized parameters for telecommunication network software. The information specifying one or more attributes of the target telecommunication network market may be used to identify one or more optimized parameters for the telecommunication network software.

In some embodiments, the telecommunication network optimization data structure includes information specifying telecommunication network market data for a plurality of telecommunication network markets. The telecommunication network market data may include information specifying one or more attributes for a respective telecommunication network market and information specifying one or more optimized parameters for telecommunication network software associated with the respective telecommunication network market. The telecommunication network market data may include information specifying telecommunication network software associated with the respective telecommunication network market. The telecommunication network market data may include information specifying alternate optimized parameters for telecommunication network software associated with the respective telecommunication network market. The telecommunication network market data may include information specifying one or more alternate attributes of the respective telecommunication network market.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

As used in this specification and the appended claims, "improving" the quality of service for a user or subscriber includes: maintaining the current quality of service for the user or subscriber; causing at least one aspect of the quality of service, such as network capacity, bandwidth, download speed, upload speed, signal strength, or other aspects of quality of service, to be improved; and causing at least one aspect of the quality of service to be improved to the detriment of one or more other aspects of the quality of service, such as, for example, raising the upload speed at the cost of lowering network capacity.

The headings and Abstract of the Disclosure provided herein are for convenience only and do not interpret the scope or meaning of the embodiments.

Figure 1:
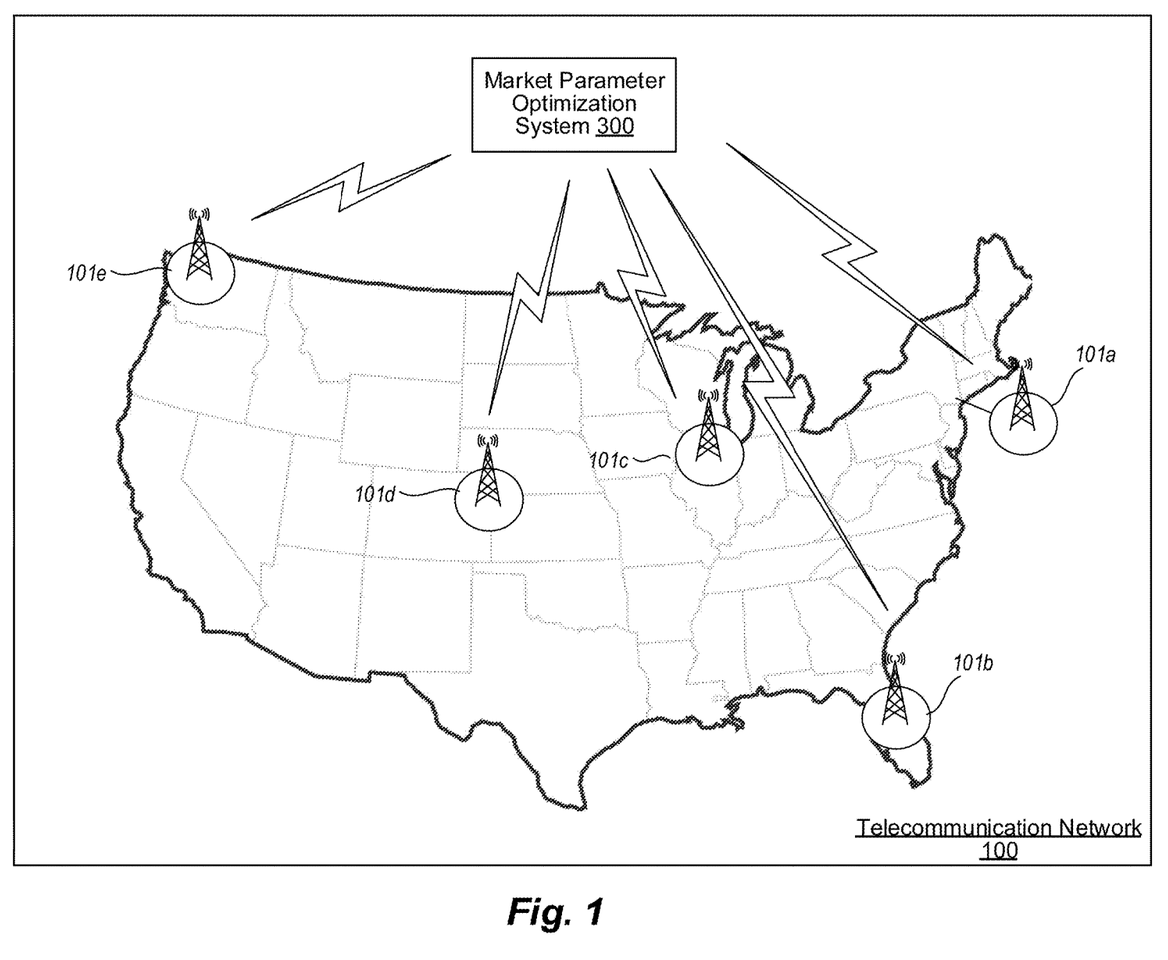
FIG. 1 is a diagram depicting an example telecommunication network in which the market parameter optimization system is implemented.

FIG. 1 is a diagram depicting an example telecommunication network 100 in which the market parameter optimization system 300 is implemented. It is to be appreciated that FIG. 1 illustrates just one example of a telecommunication network 100 and that the various embodiments discussed herein are not limited to the use of such an telecommunication network. The telecommunication network 100 includes one or more telecommunication network markets 101a-101e ("network markets") and a market parameter optimization system 300. The network markets 101a-101e are described further in FIG. 2. The market parameter optimization system 300 is described further in FIG. 3.

The telecommunication network 100 is a network, communication system, or networked system (not shown), to which the network markets 101a-101e, market parameter optimization system 300, vendor systems, and user devices may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more user devices, such as PCs, tablets, laptop computers, smartphones, personal assistants, Internet connection devices, wireless LAN, WiFi, Worldwide Interoperability for Microwave Access (WiMax) devices, or the like, may be communicatively coupled to the network and/or to each other so that the plurality of user devices are communicatively coupled together. Thus, such a network enables the market parameter optimization system 300 and network markets 101a-101e, used as part of the market parameter optimization system, to communicate with each other.

As can be seen in the telecommunication network 100, each of the network markets 101a-101e provide services to different geographic areas within a larger geographic area. Each of these geographic areas may be classified as rural, urban, suburban, coastal, island, mountainous, or other terms used to describe or classify a geographic area. Each type of geographic area may require different types of telecommunication software included in the network market serving the geographic area, as well as different parameters to configure the telecommunication network software in each market. However, geographic areas of the same or different types may share similarities in the types of telecommunication software and parameters used to optimize the quality of service provided in the respective market. Therefore, optimized parameters for telecommunication network software in a market which serves one geographic area may be used in a second market which serves a second geographic area.

The above description of the telecommunication network 100, and the various devices and functions therein, is intended as a broad, non-limiting overview of an example environment in which various embodiments of a market parameter optimization system can operate. The telecommunication network 100, and the various devices therein, may contain other devices, systems and/or media not specifically described herein. The telecommunication network 100, and the various functions therein, may contain other functions, systems and/or media not specifically described herein.

Example embodiments described herein provide applications, tools, data structures and other support to implement systems and methods for optimizing parameters used to configure telecommunication network software within a network market, such as the network markets 101a-101e. The example embodiments described herein additionally provide applications, tools, data structures and other support to implement systems and methods for mapping vendor provided parameters to parameters defined by network standards, such as the 3GPP standard used in 5G networks. Other embodiments of the described techniques may be used for other purposes, including for updating the parameters used to configure network markets in response to detecting a change in the network market. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
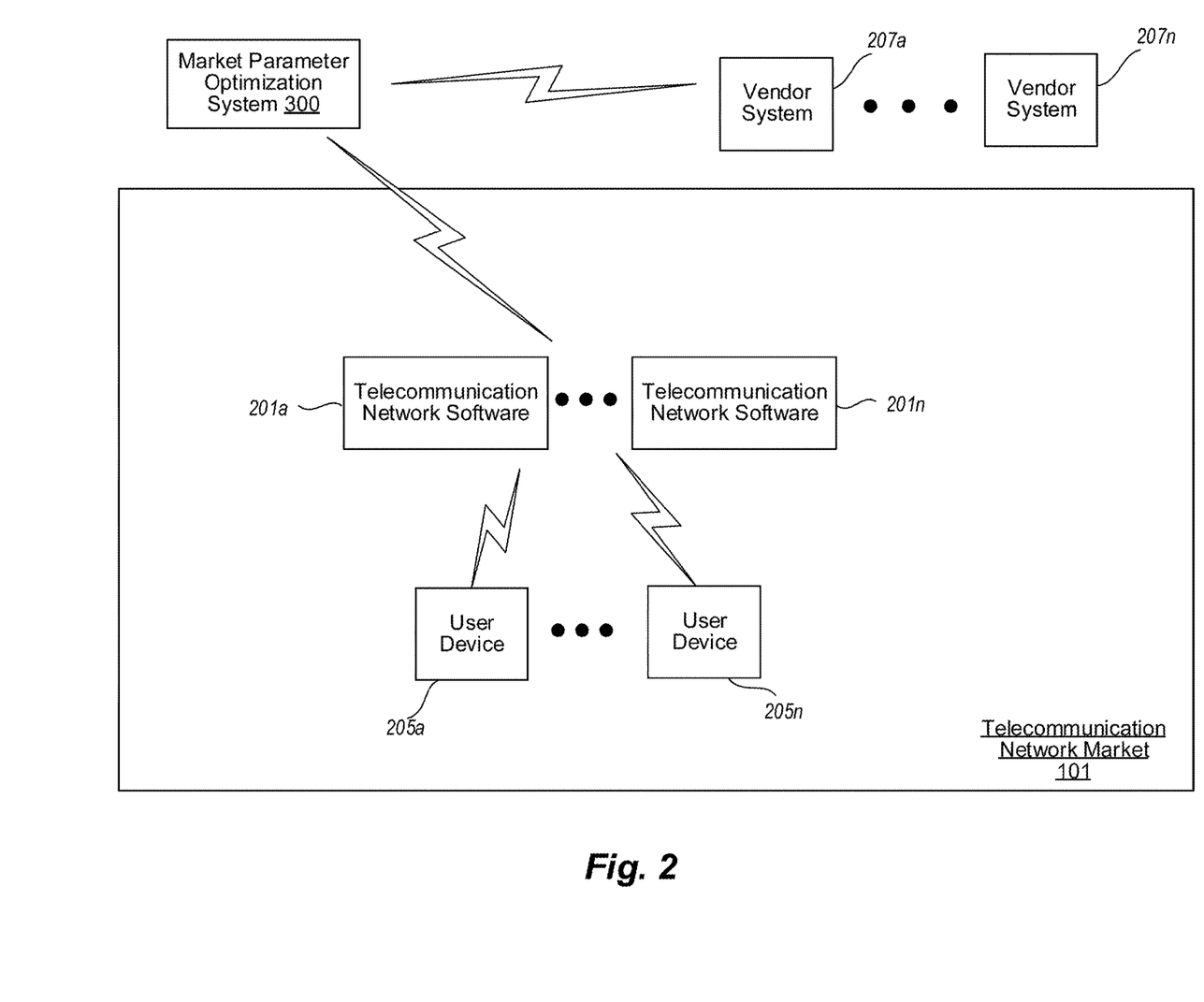
FIG. 2 is a display diagram depicting an example telecommunication network market, according to various embodiments described herein.

FIG. 2 is a display diagram depicting an example telecommunication network market 101, according to various embodiments described herein. The telecommunication network market 101 includes telecommunication software 201a-201n and user devices 205a-205n. A market parameter optimization system 300 communicates with vendors 207a-207n and at least a portion of the telecommunication software 201a-201n.

The telecommunication software 201a-201n (collectively telecommunication software 201) may include various types of telecommunication software used by a telecommunication network market 101 to provide service to user devices, such as user devices 205a-205n. The telecommunication software 201 may include software implementing network functions, virtualized network functions, and other software used for a software-based network operated on the cloud which is used by a telecommunication network market 101 to provide service to user devices. The telecommunication software 201 may include, implement, access, or otherwise use, network functions, physical network hardware or equipment, etc., to provide service to user devices.

The user devices 205a-205n (collectively user devices 205) may include devices such as cellular telephones, smartphones, tablets, personal computers, laptop computers, wireless peripheral devices such as headphones, microphones, mice, keyboards, etc., security cameras, Internet of Things (or "smart") devices, televisions, smart televisions, smart television devices—such as FireTV, Roku, AppleTV, etc., —routers, digital assistants, personal assistant devices—such as Amazon Alexa, Google Home, etc., —drones, etc. The user devices 205 may interconnect to one or more communications media or sources, such as routers, network switches, modems, telecommunication software 201, etc., to transmit communications to other devices.

The vendor systems 207a-207n (collectively vendor systems 207) may include computer systems associated with vendors, such as independent software vendors, which develop, configure, sell, provide, or otherwise make accessible telecommunication software, such as telecommunication software 201. The market parameter optimization system 300 may communicate with the vendor systems 207 to obtain parameters for telecommunication software provided by the vendors.

Figure 3:
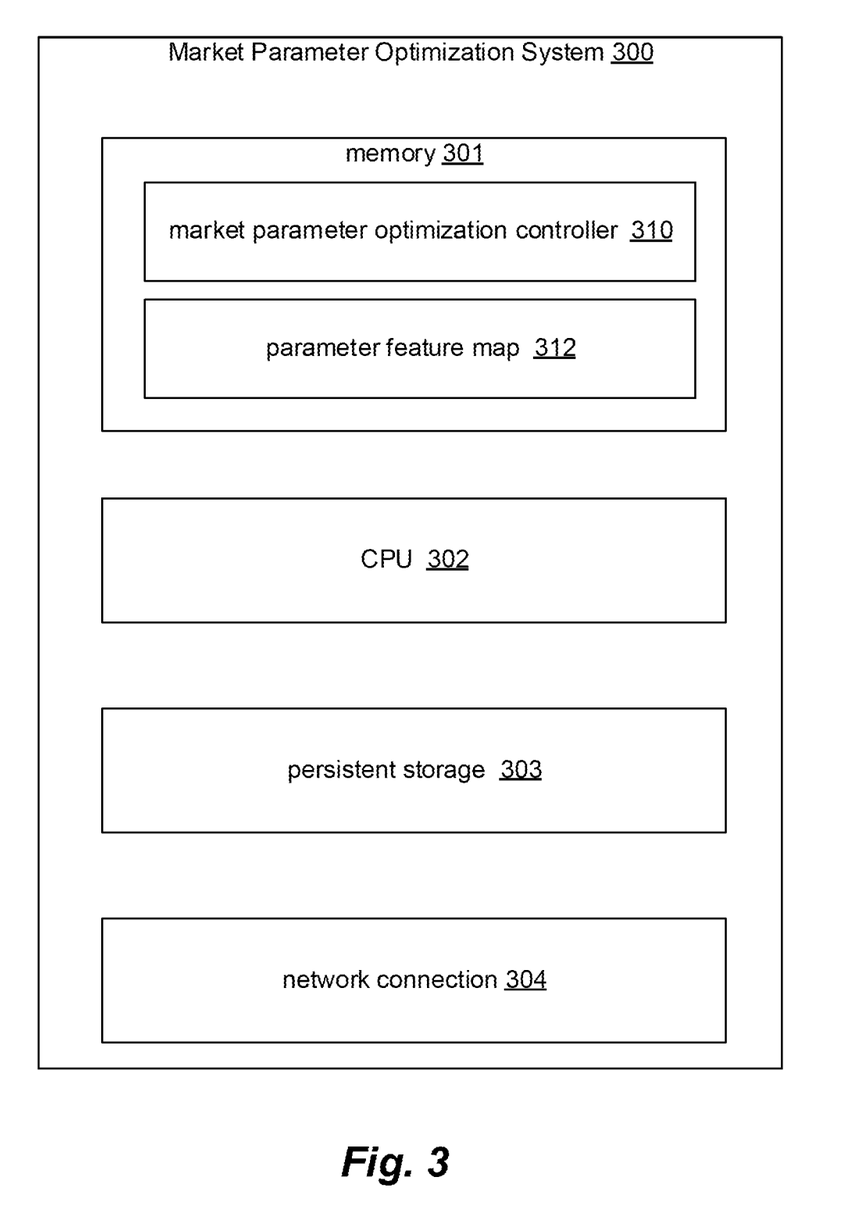
FIG. 3 is a block diagram depicting example components incorporated in a market parameter optimization system, according to various embodiments described herein.

FIG. 3 is a block diagram depicting example components incorporated in a market parameter optimization system 300, according to various embodiments described herein. In various embodiments, the market parameter optimization system 300 includes one or more of the following: a computer memory 301 for storing programs and data while they are being used, including data associated with telecommunication network markets 101, vendors 207, telecommunication software 201, and user devices 205, an operating system including a kernel, and device drivers; a central processing unit (CPU) 302 for executing computer programs; a persistent storage device 303, such as a hard drive or flash drive for persistently storing programs and data; and a network connection 304 for connecting to one or more computer devices, telecommunication network markets 101, vendors 207, telecommunication software 201, and user devices 205, other systems in the telecommunication network, and/or other computer systems, to send and/or receive data, such as via the Internet or another network and associated networking hardware, such as switches, routers, repeaters, electrical cables and optical fibers, light emitters and receivers, radio transmitters and receivers, and the like. In various embodiments, the market parameter optimization system 300 additionally includes input and output devices, such as a keyboard, a mouse, display devices, etc.

While a market parameter optimization system 300 configured as described may be used in some embodiments, in various other embodiments, the market parameter optimization system 300 may be implemented using devices of various types and configurations, and having various components. The memory 301 may include a market parameter optimization controller 310 which contains computer-executable instructions that, when executed by the CPU 302, cause the market parameter optimization system 300 to perform the operations and functions described herein. For example, the programs referenced above, which may be stored in computer memory 301, may include or be comprised of such computer-executable instructions. The memory 301 may also include a parameter feature map 312 that includes data used to map vendor specified parameters to parameters defined by one or more standard parameters, such as those defined in the 3GPP standard for 5G networks.

The market parameter optimization controller 310 performs the core functions of the market parameter optimization system 300, as discussed herein and also with respect to FIGS. 4 through 8. In particular, the market parameter optimization controller 310 determines optimized parameters for telecommunication network software used in a telecommunication network market based on attributes of the telecommunication network market. Additionally, the market parameter optimization controller 310 may obtain and map vendor parameters for telecommunication network software to standard parameters in order to more efficiently apply the parameters to telecommunication network software included in telecommunication network markets. Furthermore, the market parameter optimization controller 310 may determine that a change has occurred in the attributes of a telecommunication network market and may provide new optimized parameters for the telecommunication network software included in the telecommunication network market.

The parameter feature map 312 includes information mapping vendor-defined parameters for telecommunication network software to parameters defined by one or more standards, such as the 3GPP standard for 5G networks. The parameter feature map 312 may be generated by the market parameter optimization system 300 based on data received from one or more vendors, such as vendors 207. The parameter feature map 312 may be used by the market parameter optimization system 300 to determine how telecommunication network software parameters should be configured, enabling the market parameter optimization system 300 to transmit instructions to configure telecommunication network software based on the optimized parameters. In some embodiments, the parameter feature map 312 is not included in the market parameter optimization system, and the market parameter optimization system transmits the optimized parameters based on one or more standards, such as the 3GPP standard for 5G networks.

In an example embodiment, the market parameter optimization controller 310 and/or computer-executable instructions stored on memory 301 of the market parameter optimization system 300 are implemented using standard programming techniques. For example, the market parameter optimization controller 310 and/or computer-executable instructions stored on memory 301 of the market parameter optimization system 300 may be implemented as a "native" executable running on CPU 302, along with one or more static or dynamic libraries. In other embodiments, the market parameter optimization controller 310 and/or computer-executable instructions stored on memory 301 of the market parameter optimization system 300 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the market parameter optimization system 300.

In addition, programming interfaces to the data stored as part of the market parameter optimization controller 310 can be available by standard mechanisms such as through C, C++, C #, Java, and Web APIs; libraries for accessing files, databases, or other data repositories; through scripting languages such as JavaScript and VBScript; or through Web servers, FTP servers, or other types of servers providing access to stored data. The market parameter optimization controller 310 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of market parameter optimization system 300, telecommunication network market 101, telecommunication software 201, user devices 205, and vendors 207.

Furthermore, in some embodiments, some or all of the components/portions of the market parameter optimization controller 310, and/or functionality provided by the computer-executable instructions stored on memory 301 of the market parameter optimization system 300 may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

Figure 4:
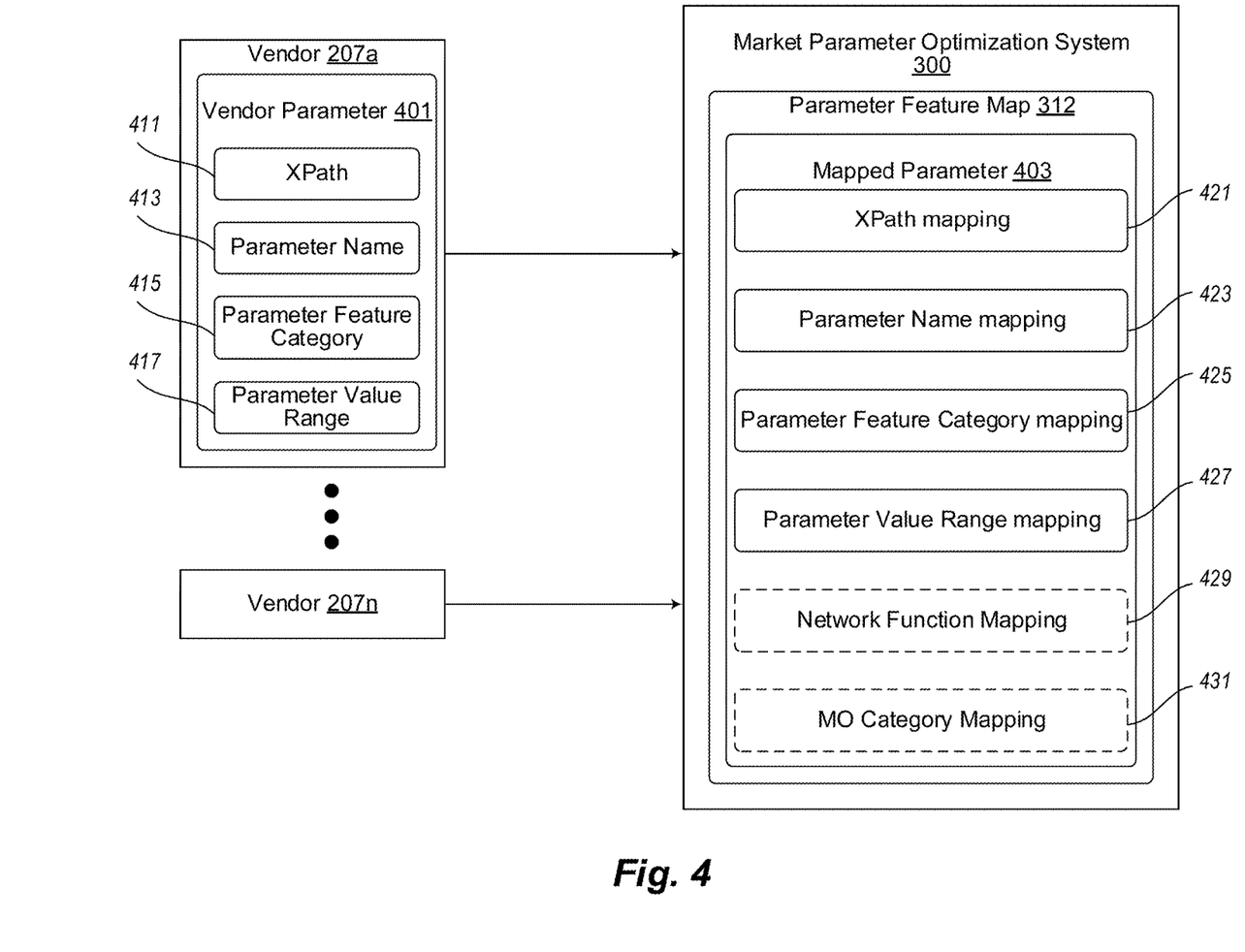
FIG. 4 is a block diagram depicting communication between one or more vendor systems and the market parameter optimization system in order to create a parameter feature map, according to various embodiments described herein.

FIG. 4 is a block diagram depicting communication between one or more vendor systems and the market parameter optimization system in order to create a parameter feature map, according to various embodiments described herein. FIG. 4 includes one or more vendors 207a-207n (collectively referred to herein as vendors 207) and a market parameter optimization system 300. The market parameter optimization system may identify which standard parameter to which the vendor-defined parameter corresponds based on one or more of: a name of the vendor-defined parameter, a name of the standard parameter, a value or range of the vendor-defined parameter, a value or range of the standard parameter, a category of the vendor-defined parameter, a category of the standard parameter, a network function related to the vendor-defined parameter, a network function related to the standard parameter, information provided by the vendor regarding vendor-defined parameters, information provided by one or more standard setting organizations regarding standard parameters, and other information useful for determining whether a vendor-defined parameter corresponds to a standard parameter.

The vendors 207 each include one or more vendor parameters, such as vendor parameter 401 and other vendor-defined parameters also defined by, provided by, etc., the particular vendor, such as vendor 207a. Vendor parameter 401 may include descriptive information, such as XML Path Language (XPath) 411, name 413, feature category 415, value range 417, network function (not shown), Model Object ("MO") category (not shown), or other descriptive information related to the vendor parameter 401. The vendors 207 transmit the "vendor-defined parameters" to the market parameter optimization system 300. In some embodiments, a vendor generates a parameter feature map which maps vendor-defined parameters to standard parameters and transmits the parameter feature map to the market parameter optimization system 300.

The market parameter optimization system 300 receives the vendor parameters, such as vendor parameter 401, from a vendor, such as vendor 207a, and maps the parameters to one or more standards to create the parameter feature map 312. The parameter feature map 312 includes a mapped parameter 403, which may include descriptive information such as an XPath mapping 421, parameter name mapping 423, parameter feature category mapping 425, and parameter value range mapping 427. In some embodiments, the mapped parameter 403 includes one or more of a network function mapping 429 and an MO category mapping 431. The descriptive information included in the mapped parameter 403 includes information identifying corresponding descriptive information received from vendors. For example, the XPath 411 is mapped to the XPath mapping 421, such that configuration settings for the parameter can be quickly applied to telecommunication network software provided by the vendor.

In some embodiments, the MO category mapping 431 indicates whether the parameter can be changed, configured, instructed to be changed, etc., by the market parameter optimization system. The market parameter optimization system 300 may determine whether the MO category of a parameter permits the market parameter optimization system 300 can cause the parameter to be changed.

Figure 5:
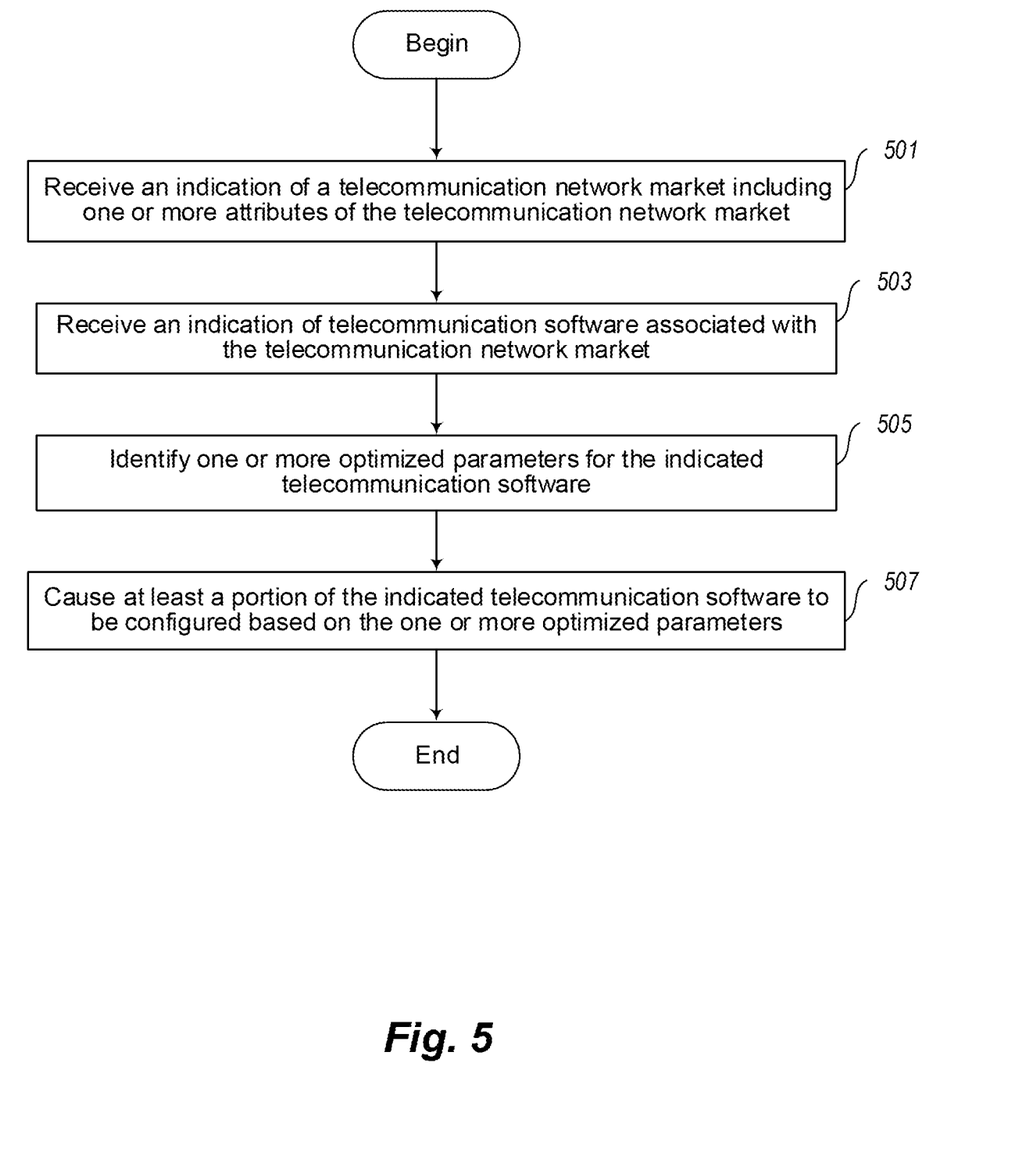
FIG. 5 is a flow diagram depicting a process to provide optimized parameters to software in a telecommunication network market, according to various embodiments described herein.

FIG. 5 is a flow diagram depicting a process to provide optimized parameters to software in a telecommunication network market, according to various embodiments described herein. At act 501, a market parameter optimization system receives an indication of a telecommunication network market including one or more attributes of the telecommunication network market. In some embodiments, the one or more attributes of the telecommunication network market include one or more of: a morphology of the network market and a traffic pattern of the network market. The morphology of the network market may be used to generate a prediction of the type of coverage area for the network market. The prediction of the type of coverage area for the network market may be based on the morphology of the network market, the type of geographic region of the network market, laws regarding telecommunication networks in the geographic region, the population of the geographic region, or other factors useful for determining a type of coverage area for a geographic region. For example, the morphology for a network market in Times Square in New York City would be a dense urban area, whereas the morphology for a network market on the coast of Florida would be as a coastal area. The market parameter optimization system may periodically receive an indication of the current attributes of the telecommunication network market.

At act 503, the market parameter optimization system receives an indication of telecommunication software associated with the telecommunication network market. In some embodiments, the market parameter optimization system maps vendor-defined parameters received from vendors associated with the telecommunication network software to standard parameters associated with a network standard, such as the 3GPP standard for 5G networks.

At act 505, the market parameter optimization system identifies one or more optimized parameters for the indicated telecommunication software. In some embodiments, the market parameter optimization system identifies the one or more optimized parameters by comparing the attributes of the telecommunication network market to attributes of other telecommunication network markets. The market parameter optimization system may determine which telecommunication network markets are similar to the telecommunication network market based on the comparison, and may identify optimized parameters based on the parameters of the similar telecommunication network markets.

In some embodiments, at act 505, the market parameter optimization system compares the attributes of the telecommunication network market to a model of an optimized telecommunication network market. The market parameter optimization system may use the attributes of the market to identify a compatible model of a telecommunication network market, and may obtain the one or more optimized parameters based on the identified model.

At act 507, the market parameter optimization system causes at least a portion of the indicated telecommunication software to be configured based on the one or more optimized parameters. The market parameter optimization system may use a parameter feature map, such as the parameter feature map 312, to cause the telecommunication software to be configured based on the one or more optimized parameters. In some embodiments, the market parameter optimization system may use the parameter feature map to adjust the one or more optimized parameters such that they are compatible with the indicated telecommunication software. In some embodiments, the market parameter optimization system causes the telecommunication software to be configured by transmitting parameters to a network site included in the telecommunication network market which configures the telecommunication software based on the transmitted parameters. In some embodiments, the market parameter optimization system causes the telecommunication software to be configured by transmitting the optimized parameters to the telecommunication software. In some embodiments, the market parameter optimization system causes the telecommunication software to be configured by transmitting instructions to a user, such as a network engineer, to configure the telecommunication network software based on the one or more optimized parameters.

After act 507, the process ends. In some embodiments, the market parameter optimization system does not perform act 503, and uses standard parameter information to cause telecommunication software to be configured based on one or more optimized parameters.

Figure 6:
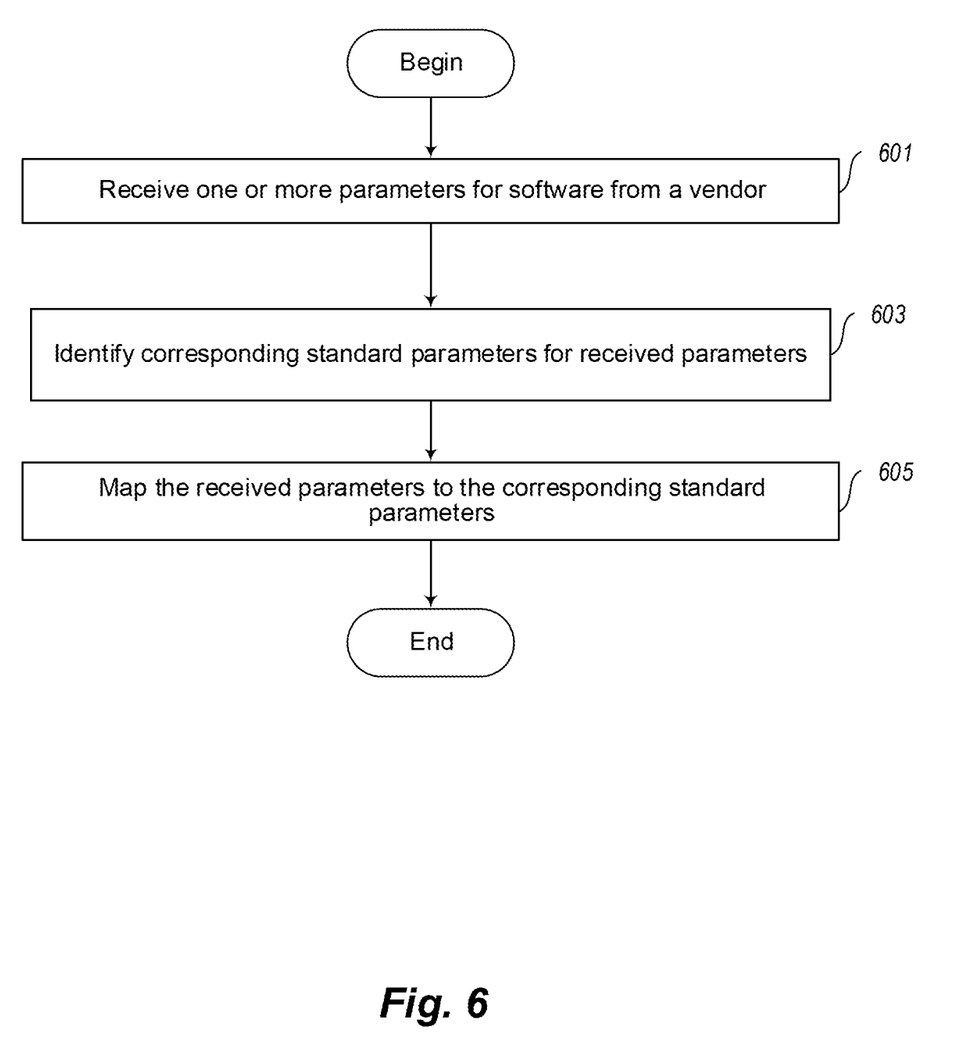
FIG. 6 is a flow diagram depicting a process to map vendor-defined parameters to standard parameters according to various embodiments described herein.

FIG. 6 is a flow diagram depicting a process to map vendor-defined parameters to standard parameters according to various embodiments described herein. At act 601, the market parameter optimization system receives data indicating one or more parameters for telecommunication network software from a vendor. The market parameter optimization system may receive the data indicating one or more parameters via one or more of: user input, data received from one or more vendor systems, data received from one or more third parties, or other methods of receiving data indicating one or more parameters for telecommunication network software.

At act 603, the market parameter optimization system identifies corresponding standard parameters for the received parameters. The market parameter optimization system may identify corresponding standard parameters by comparing the standard parameters to the received parameters.

At act 605, the market parameter optimization system maps the received parameters to the corresponding standard parameters. In some embodiments, at act 605, the market parameter optimization system generates or updates a parameter feature map, such as the parameter feature map 312, based on the mapped parameters.

After act 605, the process ends.

Figure 7:
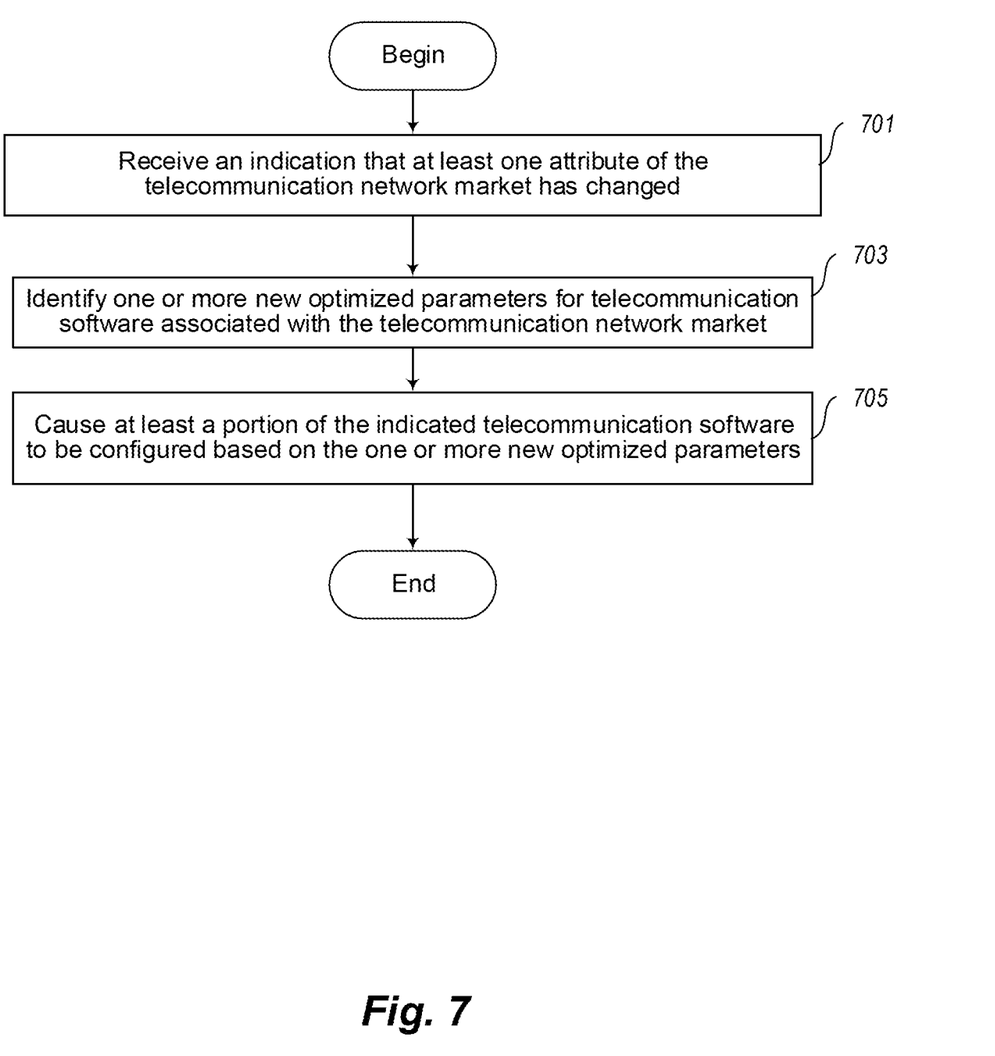
FIG. 7 is a flow diagram depicting a process to cause software to be configured based on new optimized parameters, according to various embodiments described herein.

FIG. 7 is a flow diagram depicting a process to cause software to be configured based on new optimized parameters, according to various embodiments described herein. At act 701, the market parameter optimization system receives an indication that at least one attribute of the telecommunication network market has changed.

At act 703, the market parameter optimization system identifies one or more new optimized parameters for telecommunication software associated with the telecommunication network market based on the indication that at least one attribute of the telecommunication network market has changed. The market parameter optimization system may perform act 703 in a similar manner to act 505.

At act 705, the market parameter optimization system causes at least a portion of the indicated telecommunication software to be configured based on the one or more new optimized parameters. The market parameter optimization system may perform act 705 in a similar manner to act 507.

After act 705, the process ends. In some embodiments, the market parameter optimization system periodically receives data describing one or more attributes of one or more telecommunication network markets. The market parameter optimization system may determine whether at least one attribute of a telecommunication network market has changed and may perform the process described in FIG. 7 in response to a determination that an attribute of a telecommunication network market has changed. Thus, the market parameter optimization system is able to dynamically update the configuration of telecommunication network software in the telecommunication network market when an attribute of the telecommunication network market changes.

Figure 8:
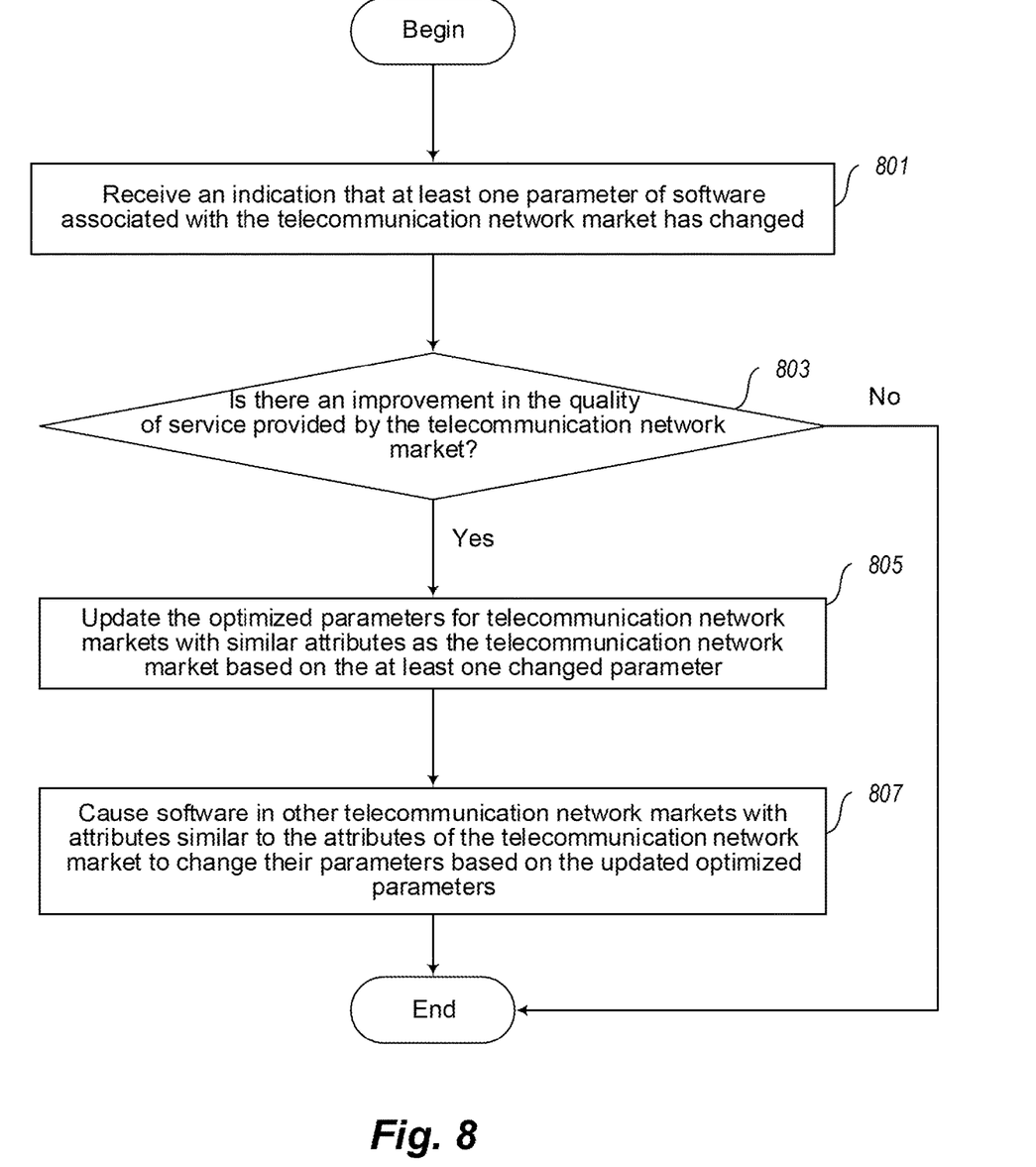
FIG. 8 is a flow diagram depicting a process to determine whether a change in parameters of software associated with a telecommunication network market has improved the performance of the software, according to various embodiments described herein.

FIG. 8 is a flow diagram depicting a process to determine whether a change in parameters of software associated with a telecommunication network market has improved the performance of the software, according to various embodiments described herein. At act 801, the market parameter optimization system receives an indication that at least one parameter of telecommunication network software associated with the telecommunication network market has changed.

At act 803, the market parameter optimization system determines whether there is an improvement in the quality of service provided to users in the telecommunication network market. The market parameter optimization system may determine whether there is an improvement in the quality of service by comparing quality of service statistics from before the parameter was changed to quality of services statistics from after the parameter was changed. If there was not an improvement in the quality of service, the process ends. If there was an improvement in the quality of service, the process continues to act 805.

At act 805, the market parameter optimization system updates the optimized parameters for markets with attributes similar to the telecommunication network market based on the at least one changed parameter.

At act 807, the market parameter optimization system causes telecommunication network software in other telecommunication network markets with attributes similar to the attributes of the telecommunication network market to change their parameters based on the updated optimized parameters. In some embodiments, the market parameter optimization system does not perform act 807. In some embodiments, the market parameter optimization system updates, alters, creates, etc., a model for an optimized telecommunication market based on the telecommunication network market, the updated optimized parameters for the telecommunication network market, and the attributes of the telecommunication network market. The market parameter optimization system may use the model based on the telecommunication network market to perform act 807.

After act 807, the process ends.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
at least one processor; and
at least one memory coupled to the at least one processor, the memory having computer-executable instructions stored thereon that, when executed by the at least one processor, cause the system to:

receive an indication of a telecommunication network market, the indication of the telecommunication network market including one or more attributes of the telecommunication network market, the one or more attributes indicating at least a traffic pattern of the telecommunication network market and a morphology of the telecommunication network market;

receive an indication of telecommunication network software which will be deployed at the telecommunication network market;

identify one or more optimized parameters for the indicated telecommunication network software based on a comparison of the one or more attributes of the telecommunication network market to attributes of one or more other telecommunication network markets, including:
a comparison of the traffic pattern of the telecommunication network market to a traffic pattern of at least one telecommunication network market of the one or more other telecommunication network markets; and
a comparison of the morphology of the telecommunication network market to a morphology of at least one telecommunication network market of the one or more other telecommunication network markets; and cause at least a portion of the indicated telecommunication network software to be configured based on the one or more optimized parameters.

2. The system of claim 1, wherein causing the system to identify one or more optimized parameters further comprises causing the system to:
access a repository of telecommunication network market data, the repository of telecommunication network market data including data describing one or more telecommunication network markets, the data including, for each respective telecommunication network market of the one or more telecommunication network markets:
one or more attributes of the respective telecommunication network market; and
one or more parameters for telecommunication network software.

3. The system of claim 2, wherein causing the system to identify one or more optimized parameters further comprises causing the system to:
compare the one or more attributes of the telecommunication network market to one or more attributes of at least one telecommunication network market included in the repository of telecommunication network market data.

4. The system of claim 2, wherein the telecommunication network market data further includes, for each telecommunication network market of the one or more telecommunication network markets:
one or more optimized parameters for telecommunication network software.

5. The system of claim 1, wherein causing the system to identify one or more optimized parameters comprises causing the system to:
identify the one or more optimized parameters based on at least the one or more attributes of the telecommunication network market and the indication of the telecommunication network software.

6. The system of claim 1, wherein the system is further caused to:

receive an indication that at least one attribute of the telecommunication network market has changed;
identify one or more new optimized parameters for the indicated telecommunication network software based on at least the one or more attributes of the telecommunication network market and the indication that at least one attribute of the telecommunication network market has changed; and
cause at least a portion of the indicated telecommunication network software to be configured based on the one or more new optimized parameters.

7. One or more storage devices collectively storing a telecommunication network market optimization data structure for access and processing by a program executed by at least one computer processor that, when accessed and processed by at least one computer processor, functionally enables the at least one computer processor to:
cause at least a portion of telecommunication network software associated with a telecommunication network market to be configured based on one or more optimized parameters for the telecommunication network software, the telecommunication network market optimization data structure comprising:
information specifying a target telecommunication network market, the information specifying the target telecommunication network market including one or more attributes of the target telecommunication network market, the one or more attributes indicating at least a traffic pattern of the target telecommunication network market;
information specifying the telecommunication network software associated with the target telecommunication network market; and
information specifying a plurality of optimized parameters for telecommunication network software,
such that the information specifying one or more attributes of the target telecommunication network market is usable to identify the one or more optimized parameters for the telecommunication network software based on a comparison of the traffic pattern of the target telecommunication network market to a traffic pattern of at least one other telecommunication network market.

8. The one or more storage devices of claim 7, wherein the telecommunication network market optimization data structure further comprises:
information specifying telecommunication network market data for a plurality of telecommunication network markets, the telecommunication network market data including, for each telecommunication network market of the plurality of telecommunication network markets:
information specifying one or more attributes for the respective telecommunication network market; and
information specifying one or more optimized parameters for telecommunication network software associated with the respective telecommunication network market.

9. The one or more storage devices of claim 8, wherein the telecommunication network market data further includes, for each telecommunication network market of the plurality of telecommunication network markets:
information specifying telecommunication network software associated with the respective telecommunication network market.

10. The one or more storage devices of claim 8, wherein the telecommunication network market data further includes, for at least one telecommunication network market of the plurality of telecommunication network markets:
information specifying alternate optimized parameters for telecommunication network software associated with the respective telecommunication network market; and
information specifying one or more alternate attributes of the respective telecommunication network market.

11. The one or more storage devices of claim 7, wherein the one or more attributes of the target telecommunication network market include at least one attribute describing a morphology of the telecommunication network market.

12. A method in a telecommunication network market parameter optimization system, the method comprising:
electronically receiving, by at least one processor, an indication of a telecommunication network market, the indication of a telecommunication network market including one or more attributes of the telecommunication network market, the one or more attributes indicating at least a morphology of the telecommunication network market;
electronically receiving, by the at least one processor, receiving an indication of telecommunication network software which will be deployed at the telecommunication network market;
electronically identifying, by the at least one processor, one or more optimized parameters for the indicated telecommunication network software based on at least the one or more attributes of the telecommunication network market by comparing the morphology of the telecommunication network market to a morphology of at least one other telecommunication network market; and
electronically causing, by the at least one processor, at least a portion of the indicated telecommunication network software to be configured based on the one or more optimized parameters.

13. The method of claim 12, wherein electronically identifying one or more optimized parameters further comprises:
electronically accessing, by the at least one processor, a repository of telecommunication network market data, the repository of telecommunication network market data including data describing one or more telecommunication network markets, the data including, for each telecommunication network market of the one or more telecommunication network markets:
one or more attributes of the telecommunication network market; and
one or more parameters for telecommunication network software.

14. The method of claim 13, wherein electronically identifying the one or more optimized parameters further comprises:
electronically comparing, by the at least one processor, the one or more attributes of the telecommunication network market to one or more attributes of at least one telecommunication network market included in the repository of telecommunication network market data.

15. The method of claim 12, further comprising:
electronically receiving, by the at least one processor, an indication that at least one attribute of the telecommunication network market has changed;
electronically identifying, by the at least one processor, one or more new optimized parameters for the indicated telecommunication network software based on at least the one or more attributes of the telecommunication network market and the indication that at least one attribute of the telecommunication network market has changed; and electronically causing, by the at least one processor, at least a portion of the indicated telecommunication network software to be configured based on the one or more new optimized parameters.

\* \* \* \* \*